United States Patent [19]

Béguin et al.

[11] 4,173,545

[45] Nov. 6, 1979

[54] LIQUID CRYSTAL WITH HIGH NEGATIVE DIELECTRIC ANISOTROPY AND MIXTURES OF THE SAME WITH NEMATIC LIQUID CRYSTALS FOR IMPROVING DYNAMIC SCATTERING IN ELECTRO-OPTIC DEVICES

[75] Inventors: Alain Béguin; Jean-Claude Dubois; Annie Zann, all of Paris, France

[73] Assignee: Thomson-CSF, Paris, France

[21] Appl. No.: 913,106

[22] Filed: Jun. 6, 1978

Related U.S. Application Data

[63] Continuation of Ser. No. 785,113, Apr. 6, 1977, abandoned.

[30] Foreign Application Priority Data

Apr. 6, 1976 [FR] France .................................. 76 09884
Jul. 7, 1976 [FR] France .................................. 76 20768

[51] Int. Cl.² .................. C09K 3/34; C02F 1/13; C07C 69/88; C07C 79/46; C07C 121/64; C07C 121/75
[52] U.S. Cl. .................................... 252/299; 252/408; 260/465 D; 350/346; 350/350; 560/21; 560/23; 560/65
[58] Field of Search ............... 252/299, 408; 350/350, 350/346; 260/465 D; 560/21, 23, 65

[56] References Cited

U.S. PATENT DOCUMENTS

| | | | |
|---|---|---|---|
| 3,915,883 | 10/1975 | Van Meter et al. | 252/299 |
| 3,953,491 | 4/1976 | Steinstrasser et al. | 252/299 |
| 4,001,137 | 1/1977 | Steinstrasser | 252/299 |
| 4,009,934 | 3/1977 | Goodwin et al. | 252/299 |
| 4,020,002 | 4/1977 | Oh | 252/299 |

OTHER PUBLICATIONS

Steinstrasser, R. Angew. Chem. Internat. Edit., vol. 11, No. 7, pp 633–634 (1972).
Steinstrasser, R., Z. Naturforsch, vol. 27b, pp. 774–779 (1972).

*Primary Examiner*—Benjamin R. Padgett
*Assistant Examiner*—T. S. Gron
*Attorney, Agent, or Firm*—Oblon, Fisher, Spivak, McClelland & Maier

[57] ABSTRACT

A liquid crystal composition with high negative dielectric anisotropy, which is capable of exhibiting a high dynamic light scattering effect and of inducing similar characteristics into mixtures of the liquid crystal and another nematic liquid crystal and which derives an advantage from a larger mesomorphic temperature range, which comprises at least one compound of the formula:

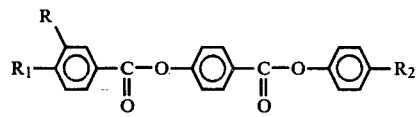

wherein R represents $NO_2$, bromine or cyano; $R_1$ is an alkyl or alkoxy group and $R_2$ is an alkyl group.

7 Claims, No Drawings

LIQUID CRYSTAL WITH HIGH NEGATIVE DIELECTRIC ANISOTROPY AND MIXTURES OF THE SAME WITH NEMATIC LIQUID CRYSTALS FOR IMPROVING DYNAMIC SCATTERING IN ELECTRO-OPTIC DEVICES

This is a continuation, of application Ser. No. 785,113, filed Apr. 6, 1977, now abandoned.

BACKGROUND OF THE INVENTION

1. Field of the Invention

The present invention relates to a series of organic compounds which form a class of substances containing alkyl or alkoxy groups, which are only distinguished from one another by a $NO_2$, Br or CN group and which, alone or in admixture, form a liquid crystal with a high negative dielectric anisotropy and which are, therefore, capable of producing high dynamic light scattering.

2. Description of the Prior Art

It is known that certain liquid crystals in the temperature range where they exist in the nematic mesomorphic phase, exhibit the effect of dynamic light scattering when they are subjected to a continuous or alternating electrical field. This effect is utilized in the electro-optical and visualization fields.

The performance characteristics of such liquid crystals are measured in terms of their operating temperature range, the contrast level of the material, and the service life when subjected to the voltage of a current.

It will be recalled that dynamic light scattering only appears for nematic compounds which possess negative dielectric anisotropy, i.e. compounds where the dielectric constant measured perpendicularly to the major axis of the molecule is greater than the dielectric constant measured parallel to the major axis. In order to obtain compounds of this type, a functional group which possesses a high dipole moment, for example, is connected to an elongated organic molecule in such a position that the resulting dipole moment is substantially perpendicular to the major axis of the molecule.

The series of elongated organic compounds are shown in French Pat. No. 2,181,943, filed Apr. 20, 1973, which have the general formula:

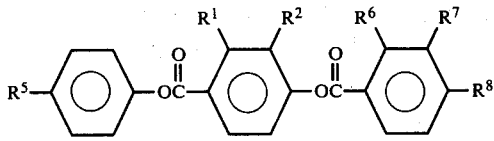

wherein $R^5$ and $R^8$ are alkyl or alkoxy groups which have from one to twelve carbon atoms, or halogen atoms, and wherein $R^1$–$R^4$, $R^6$, and $R^7$ are hydrogen, cyano, or halogen atoms or methyl or methoxy groups. Of most interest, at least in the context of the present invention, are the compounds in which $R^1=R^2=R^6=R^7=H$, $R^7$ is Cl and $R^8$ is $C_5H_{11}O$. However, the reference provides no information about the dielectric anisotropy of the compounds and no information about the synthesis of the compounds. In addition, only a few of all of the possible compounds within the scope of the generic formula are identified as mesomorphic over a given temperature range. For the compound of most pertinent interest to the present invention, a mesomorphic temperature range is described but no dielectric anisotropy value is given.

R. M. Goodwin et al, in "Research Disclosure", 131 pages 28–31 (March 1975) disclose liquid crystals having the formula:

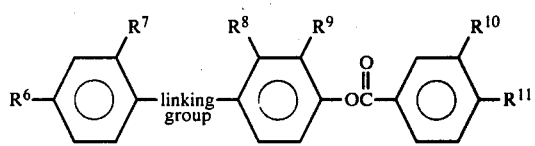

wherein $R^6$ and $R^{11}$ are alkyl or alkoxy and $R^7$–$R^{10}$ are hydrogen, halogen, or cyano groups. The "linking group" can be a carbonyloxy group. The reference indicates that the compounds are liquid crystals which possess a positive zero frequency dielectric anisotropy and which exhibit a dielectric anisotropy inversion at increasing frequencies of an applied field in the audio frequency range. However, the compounds are not described as possessing high negative dielectric anisotropies.

A need, therefore, continues to exist for liquid crystal compounds which possess high negative dielectric anisotropies.

SUMMARY OF THE INVENTION

Accordingly, one object of the present invention is to provide liquid crystal compounds which possess high negative dielectric characteristics.

Another object of the present invention is to provide liquid crystal compounds whose dynamic light scattering characteristics are greater than those of known liquid crystals.

Briefly, these objects and other objects of the present invention as hereinafter will become more readily apparent can be attained by a liquid crystal composition which is at least one organic compound having the general formula:

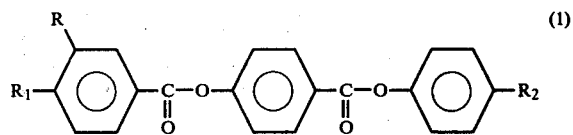

wherein R represents nitro, bromine, or cyano; $R_1$ is a $C_nH_{2n+1}$ alkyl group or a $C_nH_{2n+1}O$ alkoxy group, and $R_2$ is a $C_nH_{2n+1}$ alkyl group, wherein n is an integer from 1 to 10.

DESCRIPTION OF THE PREFERRED EMBODIMENTS

Preferred embodiments of the liquid crystal compounds of the present invention include p-alkyl-phenol-4'-hydroxybenzoate-4-alkyl(alkoxy)-3-nitrobenzoate when substituent R is nitro, p-alkyl-phenol-4'-hydroxybenzoate-4-alkyl(alkoxy)-3-bromobenzoate when substituent R is bromine, and p-alkyl-phenol-4'-hydroxybenzoate-4-alkyl(alkoxy)-3-nitrile benzoate when substituent R is cyano.

The liquid crystal compounds of the present invention can be prepared by any convenient technique as the method of preparation is not critical. In a preferred method of synthesis of the present compound, the first step of the synthesis is common to all compounds of the class and is the reaction between essentially equimolar amounts of an alkyl phenol of the formula:

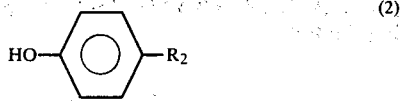

and p-hydroxybenzoic acid of the formula:

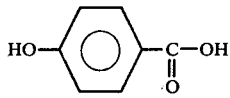

thereby forming a p-alkyl-phenol-4-hydroybenzoate ester having the formula:

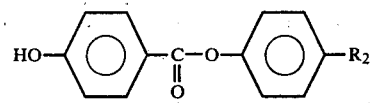

To complete the preparation of the nitro group containing compounds wherein R is nitro, the benzoate ester (3) formed above is reacted with an essentially equimolar amount of a 4-alkyl(alkoxy)-3-nitrobenzoyl halide of the formula:

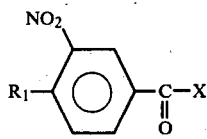

wherein X is halogen such as chloride, bromine, or iodine, thereby forming the desired p-alkyl-phenol-4'-hydroxybenzoate-4-alkyl(akoxy)-3-nitrobenzoate product wherein R is nitro.

In the preparation of the bromine containing compounds of the present invention, wherein R in Formula (1) is bromine, a p-alkyl(alkoxy)benzoic acid compound is brominated to yield the desired p-alkyl(akoxy)-3 bromobenzoic acid compound

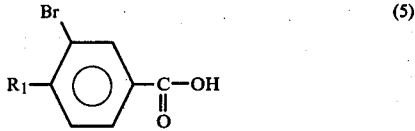

In a preferred embodiment, the bromination reaction is conducted in an aqueous solution of $AgNO_3$ or pure water, depending upon whether $R_1$ is alkyl or alkoxy.

Compound 5 is then converted to the corresponding acid halide compound by treatment with a conventional halogenation agent such as thionyl chloride, sulfuryl chloride or the like.

The brominated benzoyl halide compound is then reacted with ester compound (4) to yield the desired brominated product (1) wherein R is bromine.

The preparation of the cyano substituted compounds of the present invention is conducted in essentially the same manner and under the same conditions of the brominated compound with the exception that the above bromine substituted product compound (1) is converted to the corresponding cyano substituted compound with CuCN in the presence of polar solvent such as dimethylformamide.

Having generally described this invention, a further understanding can be obtained by reference to certain specific examples which are provided herein for purposes of illustration only and are not intended to be limiting unless otherwise specified.

PREPARATION OF THE ALKOXY SUBSTITUTED COMPOUNDS OF THE INVENTION

First Step of the Reaction

A 42.9 g (0.3 mole) amount of p-pentyl-phenol, 27.6 g (0.2 mole) of p-hydroxybenzoic acid, 1 g of concentrated sulfuric acid and 0.62 g of boric acid were mixed in 1 liter of toluene. The mixture was refluxed for 21 hours with removal of the water formed during the reaction by decantation. The toluene was then evaporated and the solid obtained was recrystallized from acetonitrile whereby pure p-pentyl-phenol-4-hydroxybenzoate was obtained.

Bromination Reaction

A 25 g (0.1 mole) amount of p-octyloxybenzoic acid was suspended in 120 ml of water. The temperature was increased to between 50° C. and 55° C. and 17.6 g (0.11 mole) of bromine were added over a period of 7 hours at that temperature. The suspended solids were then filtered and recrystallized from ethanol and pure 4-octyloxy-3-bromobenzoic acid was obtained.

Debromination Reaction

A 2.5 g ($5 \times 10^{-3}$ mole) amount of p-pentyl-phenol-4'-hydroxy benzoate-4-methoxy-3-bromobenzoate and 0.55 g ($6 \times 10^{-3}$ mole) of cuprous cyanide were introduced into 10 ml of dimethyl formamide. After refluxing the mixture for 6 hours, the solution was poured into a mixture of 5 g of ethylenediamine in 60 ml of water. After stirring, the solution was extracted with ether. The solid obtained after distillation of the ether was purified by column chromatography with silica, whereby p-pentyl-phenol-4'-hydroxybenzoate-4-methoxy-3-nitrile benzoate was obtained.

PREPARATION OF THE ALKYL SUBSTITUTED COMPOUNDS OF THE INVENTION

First Step of the Reaction

Into a liter of toluene was introduced 49.2 g (0.3 moles) of p-pentyl phenol, 27.6 g (0.2 moles) of p-hydroxy benzoic acid, 1 g of concentrated sulfuric acid and 0.62 g of boric acid. The reaction mixture was refluxed for 21 hours and the water of reaction decanted. The toluene was then evaporated and the solid which remained was recrystallized from acetonitrile whereby p-pentyl phenol-4-hydroxy benzoate was obtained.

Bromination reaction

To a mixture of 150 ml of glacial acetic acid, 33 ml of concentrated nitric acid and 25 ml of water, were added 8.2 g (0.05 moles) of parapropyl benzoic acid and 8.8 g (0.055 moles) of bromine. Then, at a temperature of 25° C., and over a period of half an hour, a solution of 8.5 g (0.05 moles) of silver nitrate in 25 cc of water was added. The solution was stirred for three hours, thirty minutes following which the suspended solid was removed by filtration and rinsed until neutral. Thereafter, the acid was dissolved in ethanol. Recrystallization from hexane yielded 4-propyl-3-bromo-benzoic acid.

Debromination Reaction

To 10 ml of dimethylformamide was added 2.55 g ($5 \times 10^{-3}$ moles) of parapentyl phenol-4'-hydroxy benzoate-4-propyl-3-bromo-benzoate and 0.55 g ($6 \times 10^{-3}$ moles) of cuprous cyanide. The reaction mixture was refluxed for 7 hours, 30 minutes. Thereafter, the solution was poured into a mixture of 5 g of ethylenediamine in 60 ml of water. The mixture was stirred and the solution was extracted with ether. The solid remaining after distillation of the ether was purified by chromatography on a silica column, whereby pure parapentylphenol-4'-hydroxy-benzoate-4-propyl-3-nitrile benzoate was obtained.

LIQUID CRYSTAL PROPERTIES OF ALKOXY COMPOUNDS

Pure p-pentylphenol-4-hydroxybenzoate-4-methoxybenzoate compounds substituted in the 3-position:

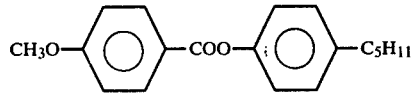

| Example No. | Substitution Group R | Transition temperatures from K to N | from N to I (note A) |
| --- | --- | --- | --- |
| 1 | CN | 123° C. | 158° C. |
| 2 | Br | 125° C. | 163° C. |
| 3 | NO₂ | 134° C. | 151.5° C. |

Note A:
K = solid crystalline phase;
N = nematic phase
I = isotropic phase.

(b) Mixtures:

A commercially available liquid nematic crystal compound (6) having the formula:

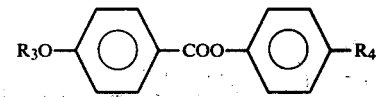

was employed as an example of a pure compound used in combination with specific compounds within the scope of the invention.

The properties of an eutectic mixture "M₁" of the following composition were investigated. The mixture comprised:

10% of the compound of Example 1; and
90% of the compound (6).

The characteristics of the mixture were as follows, wherein the transition temperatures were 25° C. and 53° C. The dielectric anisotropy of the mixture at 25° C. and at 5 kHz was −0.8. It should be noted that, under the same conditions, compound (6) alone has a low positive dielectric anisotropy. Accordingly, it is apparent that the negative anisotropy of the mixture is induced by the compound of Example 1.

The response time for a signal obtained from the eutectic mixture was determined by cutting the d.c. voltage of 30 volts:
the rise time was less than 10 ms;
the decay time was approximately 100 ms.
Contrast: excellent Service life: satisfactory. The liquid crystal was placed for a prolonged period under a d.c. or a.c. working voltage. This property is attributable to the high chemical stability of the compounds of the invention.

(2) Other mixtures to be used with liquid crystal include small amounts of a liquid crystal exhibiting negative anisotropy, at least 10% of a liquid crystal having null anisotropy, and from 30% to 90% of a liquid crystal having a positive dielectric anisotropy depending upon whether the crystal is poorly or highly positive.

10% of the compound of Example 2 was mixed with 90% of compound (6). The dielectric anisotropy of the mixture at 25° C. was −0.35.

The performance characteristics of the mixtures of compounds according to the invention with compound (6) in terms of rapidity, contrast and service life are generally improved by increasing the proportion of the compound of the present invention in the mixture. More generally, the compound (6) may be replaced by a compound of the formula:

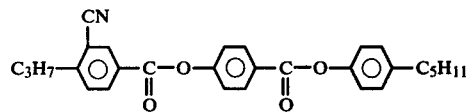

in which $R_3$ is an alkyl group $C_nH_{2n+1}$, wherein n is an integer from 1 to 10 and $R_4$ is a similar group.

LIQUID CRYSTAL PROPERTIES OF ALKYL COMPOUNDS (a) Pure compound:

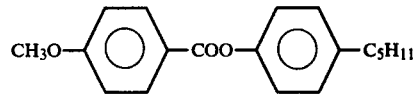

This product is nematic between 80° and 110° C. Its dielectric anisotropy measured at 84.5° C., a frequency of 15 KHz and an orientating magnetic field of 8,000 Gauss was equal to −2.9.

(b) Mixtures of above compound with another liquid crystal compound, having the formula:

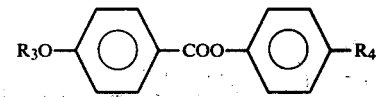

(parapentylphenol paramethoxybenzoate)

The above mixture contained 90% of the latter substance and was nematic between 20° C. and 50° C. At ambient temperature the mixture had a dielectric anisotropy of −0.6. When the mixture was subjected to a potential difference of 20 volts in a liquid crystal cell 12 microns thick it produced the phenomenon of dynamic light scattering with good contrast and a fast response time. Its threshold voltage was 7 volts under the same operating conditions.

Mixtures comprising several compounds containing an alkoxy group and several compound comprising only alkyl groups exhibit a wide mesomorphic temperature range, marked negative dielectric anisotrophy and excellent dynamic light scattering characteristics.

Having now fully described the invention, it will be apparent to one of ordinary skill in the art that many changes and modifications can be made thereto without departing from the spirit or scope of the invention as set forth herein.

What is claimed as new and intended to be secured by Letters Patent is:

1. A liquid crystal compound having the formula

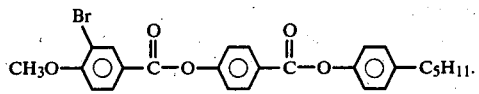

2. A liquid crystal compound having the formula

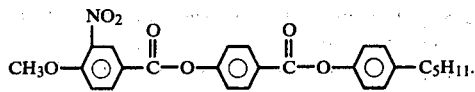

3. A liquid crystal compound having the formula

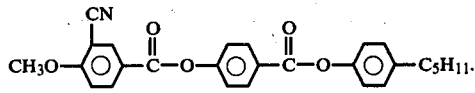

4. A liquid crystal compound having the formula

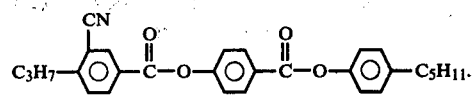

5. A liquid crystal composition, which comprises: a nematic liquid crystal having a positive dielectric anisotropy measured at 25° and 5 KHz of the formula

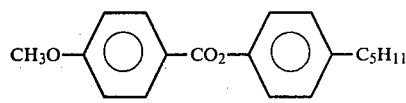

and an amount of the compound of any of claims 1, 2, 3 or 4 sufficient such that the overall composition possesses a negative dielectric anisotropy, measured at 25° C. and 5 KHZ.

6. The composition of claim 5, which comprises 10 wt.% of a compound of the formula:

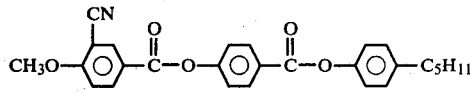

and 90 wt.% of said nematic liquid crystal having a positive dielectric anisotropy.

7. The composition of claim 5, which comprises 10 wt.% of a compound of the formula:

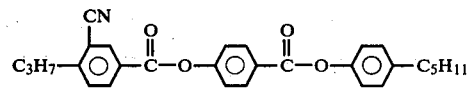

and 90 wt.% of said nematic liquid crystal having a positive dielectric anisotropy.

* * * * *